United States Patent
Bamberger

(10) Patent No.: US 11,914,192 B2
(45) Date of Patent: Feb. 27, 2024

(54) REMOTE INDICATOR

(71) Applicant: Leslie Bamberger, Gateshead (GB)

(72) Inventor: Leslie Bamberger, Gateshead (GB)

( * ) Notice: Subject to any disclaimer, the term of this patent is extended or adjusted under 35 U.S.C. 154(b) by 0 days.

(21) Appl. No.: 17/774,175

(22) PCT Filed: Nov. 3, 2020

(86) PCT No.: PCT/GB2020/052780
§ 371 (c)(1),
(2) Date: May 4, 2022

(87) PCT Pub. No.: WO2021/089994
PCT Pub. Date: May 14, 2021

(65) Prior Publication Data
US 2022/0357519 A1    Nov. 10, 2022

(30) Foreign Application Priority Data

Nov. 4, 2019 (GB) ..................................... 1916045

(51) Int. Cl.
G02B 6/35 (2006.01)

(52) U.S. Cl.
CPC .......... *G02B 6/3564* (2013.01); *G02B 6/353* (2013.01)

(58) Field of Classification Search
CPC .... G02B 6/3564; G02B 6/353; G02B 6/3502; G02B 6/3574; G02B 6/4219; G02B 6/36; G02B 6/4401; G02B 6/4202; G02B 6/0008; G02B 6/243; F21V 2200/13
See application file for complete search history.

(56) References Cited

U.S. PATENT DOCUMENTS

| 4,208,579 A | 6/1980 | Binner et al. |
| 5,408,550 A | 4/1995 | Lefevre et al. |
| 6,195,016 B1* | 2/2001 | Shankle .................. G09F 9/305 385/115 |
| 2003/0193817 A1* | 10/2003 | Yoneda ................ G02B 6/0006 362/555 |
| 2009/0109518 A1* | 4/2009 | Atkin .................... G01J 3/2823 359/290 |
| 2010/0302544 A1 | 12/2010 | Duer |
| 2011/0062888 A1* | 3/2011 | Bondy ............... H05B 45/3725 315/294 |
| 2020/0281688 A1* | 9/2020 | Lares ................... A61B 1/0684 |

FOREIGN PATENT DOCUMENTS

EP    0115126 A1    8/1984

OTHER PUBLICATIONS

Search Report and Written Opinion for priority PCT Application No. PCT/GB2020/052780 dated May 14, 2021 (9 pages).

* cited by examiner

Primary Examiner — Tina M Wong
(74) Attorney, Agent, or Firm — Padda Law Group

(57) ABSTRACT

A remote indicator system comprising a housing and a display unit located remotely from the housing. The housing comprises a first light source and a first end of an end-emitting fibre optic cable. The display unit comprises a second end of the fibre optic cable. The housing includes manual switching means configurable to allow light from the first light source to pass into the first end of the optical fibre cable and further configurable to prevent light from the first light source from passing into the first end of the optical fibre cable.

11 Claims, 6 Drawing Sheets

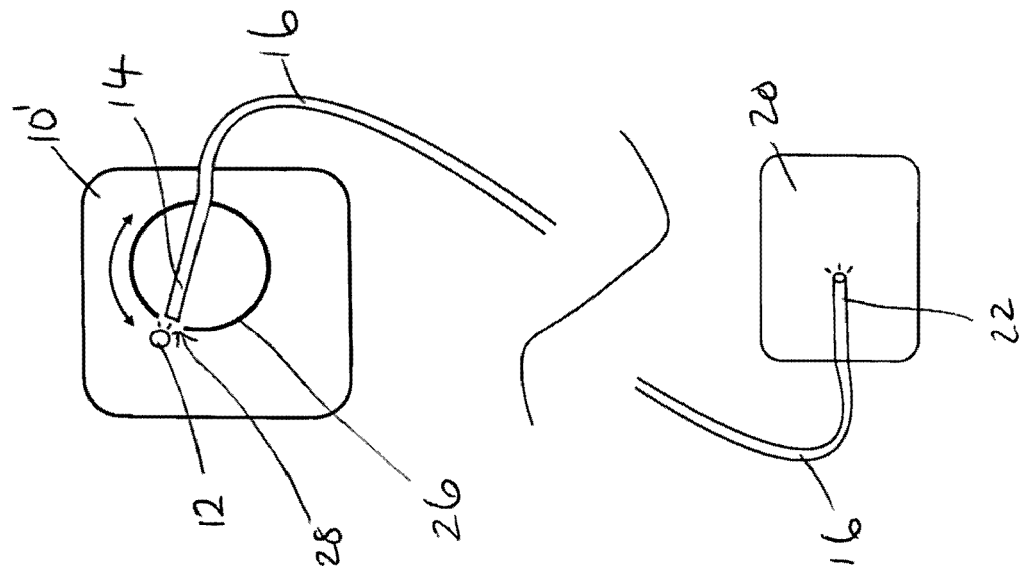
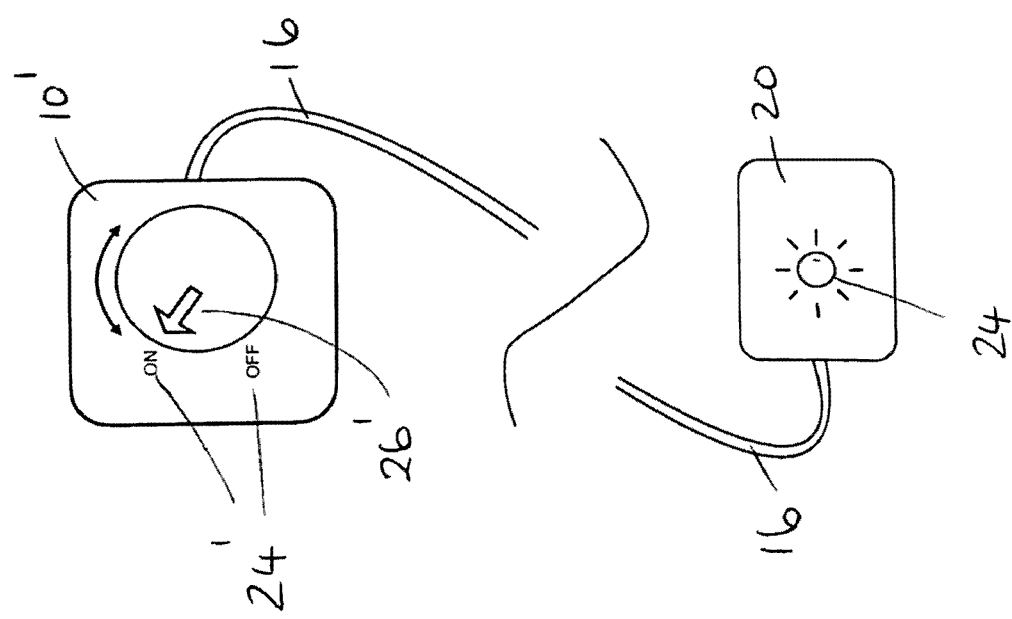

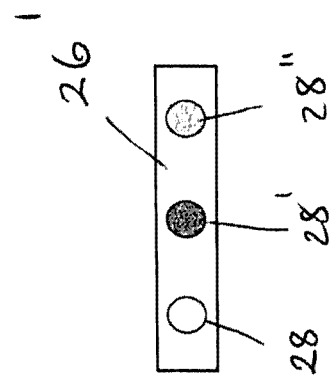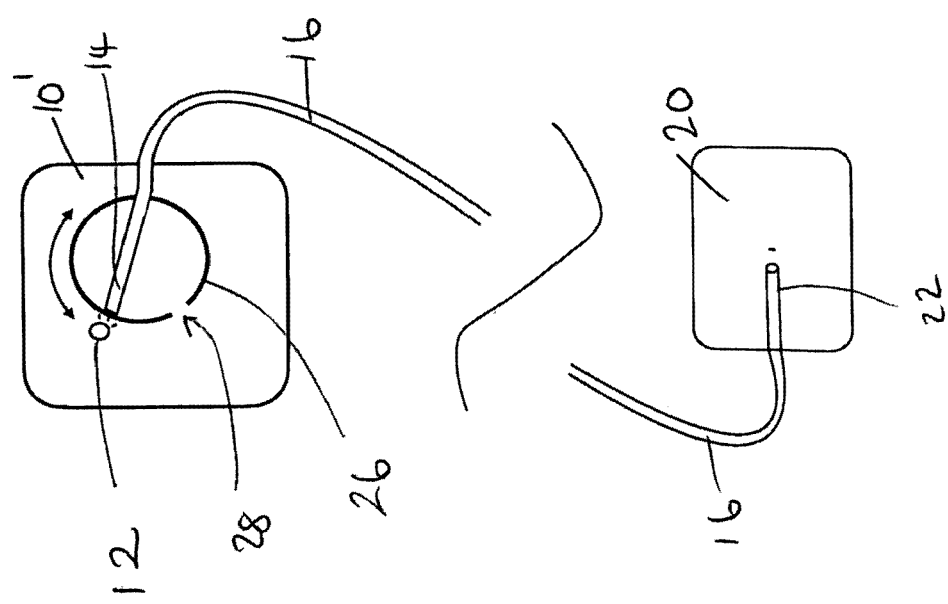

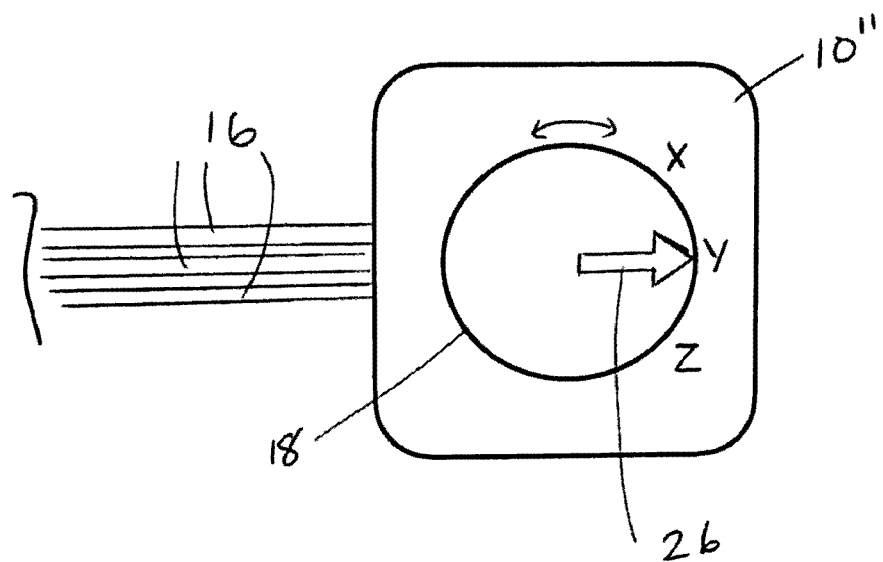
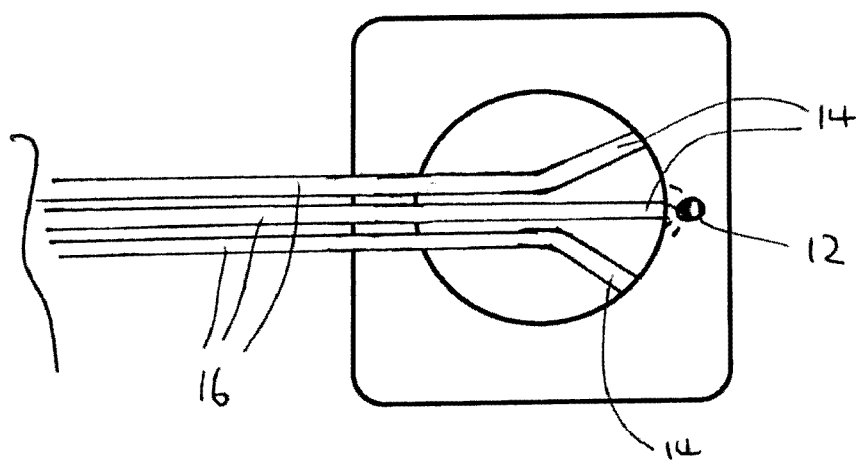

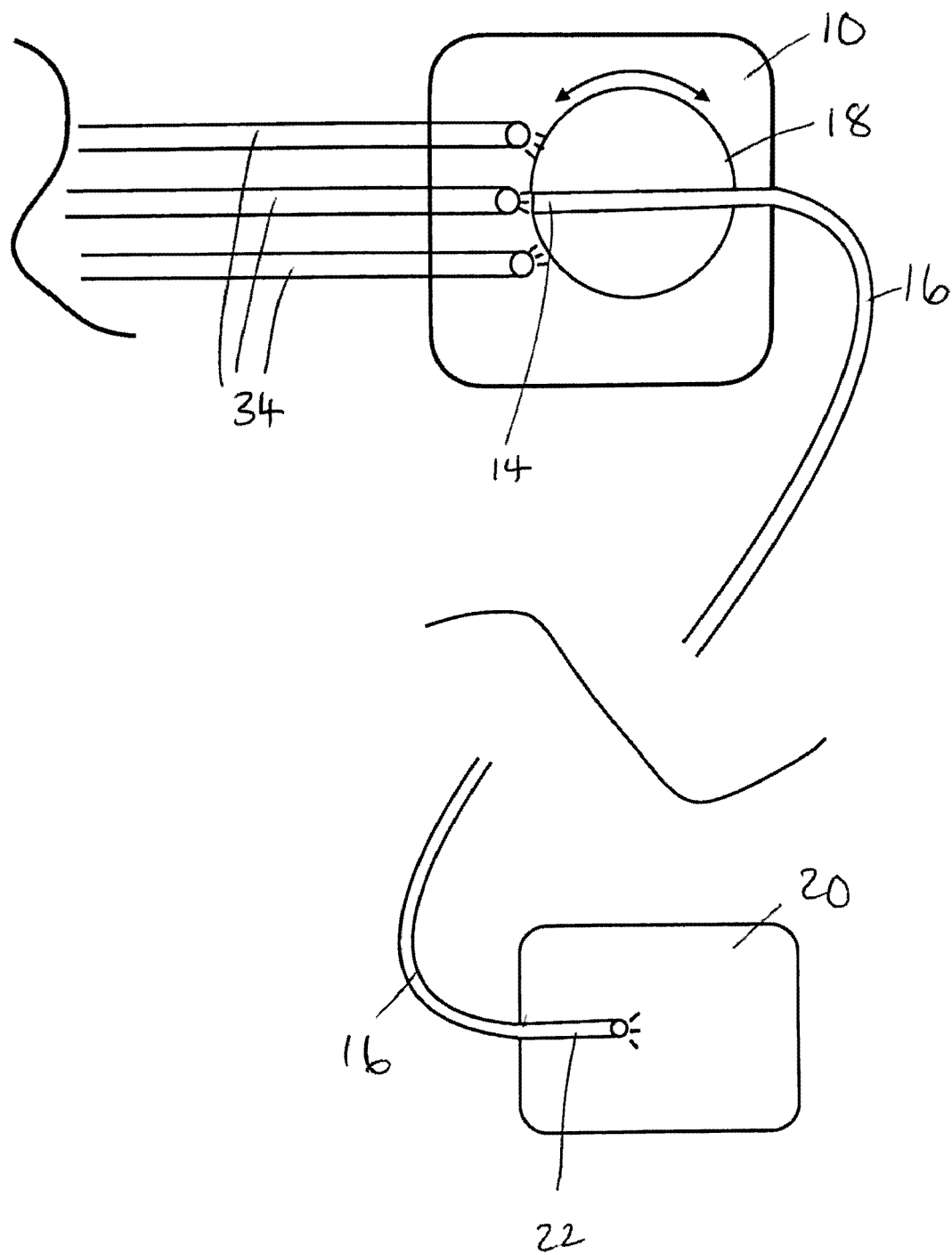

REMOTE INDICATOR

FIELD OF THE INVENTION

The present invention relates to a device which enables a remote indicator to be controlled without electrical intervention by a person observing Shabbat (Sabbath) orthodox Jewish law.

BACKGROUND OF THE INVENTION

Shabbat observant Jews are forbidden to activate any electrical devices or to create any circuit on their Sabbath, beginning on sundown on Friday and continuing until after sunset on the following Saturday. This has led to numerous machines and devices being created with a "sabbath (Shabbos) mode" but not all such devices would be acceptable to ultra Orthodox Jews who strictly observe the Sabbath.

US2009/167098_describes a wall switch which includes a transmitter, which may be a light emitting diode, and a receiver, which may be a photodetector. The device also includes one or more preventive elements capable of preventing a transmission by the transmitter from being received by the receiver. If the transmission is visible light then the preventative element may be an opaque material, therefore acting as a shutter. It also states that the preventive element may be moveable from a first position in which it prevents a transmission from a transmitter to a receiver to a second position in which it does not prevent the transmission. The receiver in this document is a sensor which takes light energy and converts it into electrical energy. It is therefore indirectly activating an electrical circuit and would not be acceptable to ultra Orthodox Jews who strictly observe the Sabbath.

IL172484 describes an automatic window blind. A transmitter transmits a signal which is received by a receiver. A shutter, is used to block the path of the signal and blocking the path of the signal causes a motor to activate the blinds. The receiver in this device is a sensor which takes light energy and converts it into electrical energy. It is therefore indirectly activating the electrical circuit including the motor and would not be acceptable to ultra Orthodox Jews who strictly observe the Sabbath.

US2012/038478 describes a control unit for actuating one or more electrical devices associated with a locking mechanism and alarm system. The control unit includes an optical emitter, an optical detector and a shutter that operates to allow or block the transmission between the two. The optical detector is a sensor which takes light energy and converts it into electrical energy. It is therefore indirectly activating the electrical circuit to the alarm system and would not be acceptable to ultra Orthodox Jews who strictly observe the Sabbath.

US2018/0142844 describes a Shabbat Bulb where the light can be controlled by a rotating shutter disc. Automatic timers are also widely used to activate devices such as lights, however these are only useful for events that can be pre-planned.

A remote call system, for example for use in a hospital or nursing home, has proven more difficult to achieve. In a remote call system, any indication or sound activated by an individual would inherently need to complete a circuit, which is forbidden on the Sabbath.

It would be desirable to provide a remote indicator system that can be used by ultra Orthodox Jews observing the Sabbath.

SUMMARY OF THE INVENTION

According to a first aspect of the invention there is provided a system for providing a remote indicator comprising a housing and a display unit located remotely from the housing, the housing comprising a first light source and a first end of an end-emitting fibre optic cable; the display unit comprising a second end of the fibre optic cable. The housing includes manual switching means configurable to allow light from the first light source to pass into the first end of the optical fibre cable and further configurable to prevent light from the first light source from passing into the first end of the optical fibre cable.

The light sources are preferably permanently lit. The manual switching means allows light to be transferred from the housing to a remote display unit without completion of an electrical circuit.

The manual switching means for aligning the first end of the optical fibre cable with the at least one light source preferably comprises one of: a moveable optical fibre cable and a moveable first light source.

Preferably, the first end of the fibre optic cable is incorporated into a moveable assembly and the manual switching means comprises movement of the assembly to effect alignment or unalignment of the first end of the fibre optic cable with the first light source, the moveable assembly having an aligned position in which the first end of the fibre optic cable is aligned with the first light source and an unaligned position in which the first end of the fibre optic cable is unaligned with the first light source.

Preferably, the moveable assembly is manually rotatable between the aligned and unaligned positions. Alternatively, the moveable assembly is manually slidable between the aligned and unaligned positions.

The housing may comprise a plurality of different coloured light sources and the moveable assembly may have a plurality of aligned positions in which the first end of the fibre optic cable is alignable with each of the light sources in turn.

The housing may include a plurality of first ends of a plurality of fibre optic cables, and a plurality of display units, each display unit including a second end of one of the fibre optic cables.

The first end of the fibre optic cable may be aligned with the first light source and the manual switching means may comprise a manually moveable shutter positioned between the first light source and the first end of the fibre optic cable, the shutter having at least one aperture, wherein the shutter has at least two positions: a first position in which the aperture is substantially aligned with the first light source and light from the first light source passes into the first end of the optic fibre cable, and a second position in which the aperture unaligned with the first light source and the shutter prevents light from the first light source passing into the first end of the optic fibre cable.

The shutter may comprise a plurality of apertures, each aperture being provided with a different coloured filter, wherein the shutter is moveable to a plurality of positions such that each aperture is alignable with the first light source.

The or each light source is preferably an LED.

The or each light source may be located remotely from the housing and the light transferred to the housing via optical fibre cabling.

The invention provides a system which allows an ultra Orthodox Jew to send a signal to a remote location on the Sabbath whilst strictly following the Shabbat laws.

BRIEF DESCRIPTION OF THE DRAWINGS

In the Drawings, which illustrate the prior art and preferred embodiments of an apparatus

FIG. 3 illustrates a stylistic plan view of a system according to the invention which includes one light source, a single fibre optic cable and a rotating shutter;

FIG. 4a illustrates a cross-sectional view through the system of FIG. 3, with the shutter aperture aligned with the light source;

FIG. 4b illustrates a cross-sectional view through the system of FIG. 3, where the shutter aperture is not aligned with the light source;

FIG. 5 illustrates a side view of a moveable shutter comprising a plurality of apertures;

FIG. 7a illustrates a stylistic plan view of an alternative system including one light source and a plurality of fibre optic cables;

FIG. 7b illustrates a stylistic cross-sectional view through the system of FIG. 7a; and FIG. 8 illustrates a stylistic cross-sectional view through an alternative system where the light sources comprise fibre optic cables.

DETAILED DESCRIPTION OF THE PREFERRED EMBODIMENTS

Figure 2:
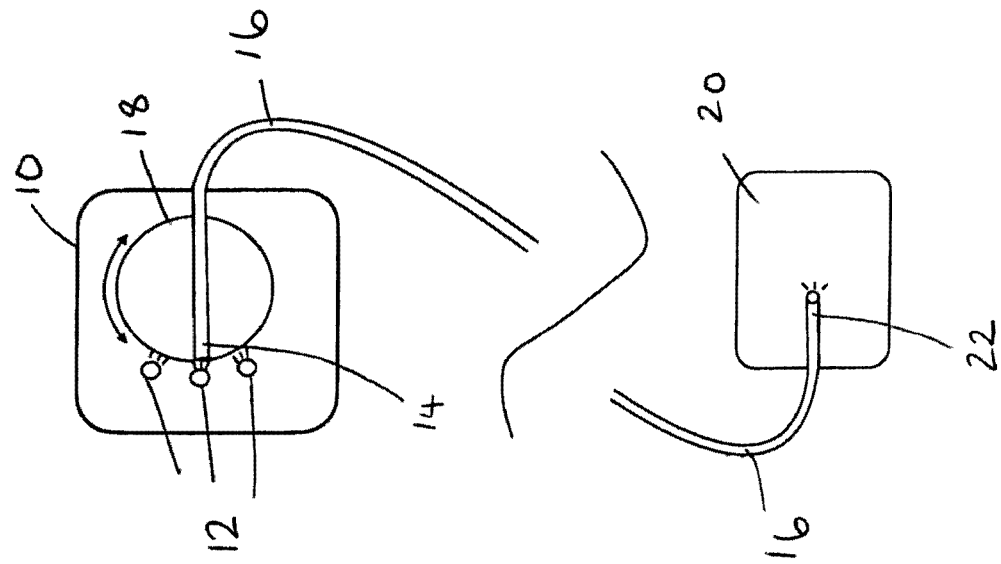
FIG. 2 illustrates a cross-sectional view through the system of FIG. 1.
Figure 1:
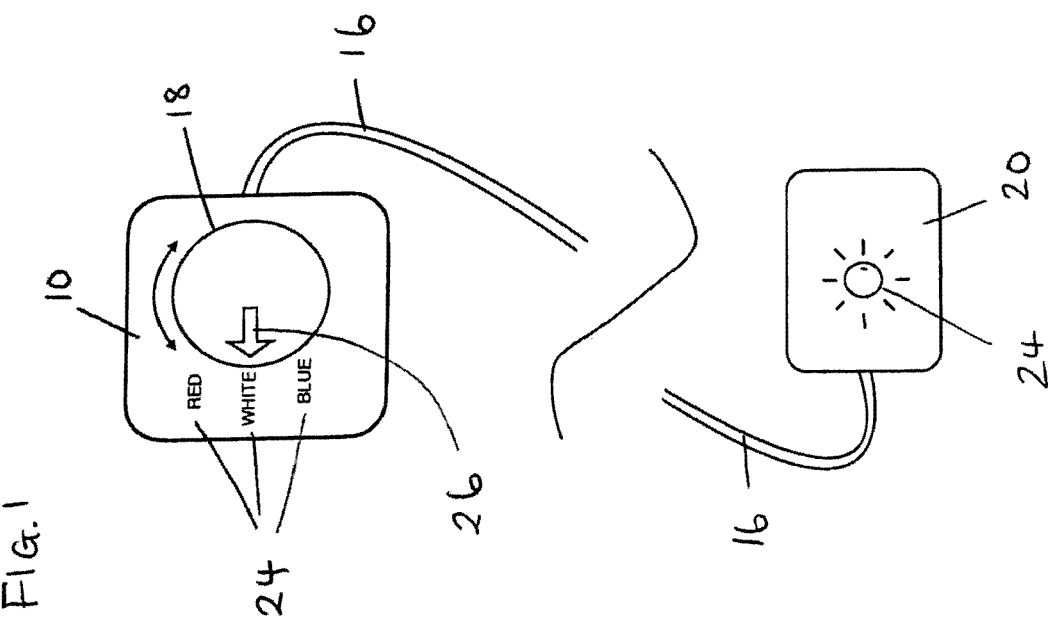
FIG. 1 illustrates a stylistic plan view of a system according to the invention including three lights sources and a single fibre optic cable.

FIGS. 1 and 2 illustrate a housing 10 containing a plurality of light sources 12, preferably in the form of different coloured LEDs. The light sources 12 are constantly illuminated. The housing 10 also contains a first end 14 of an end-emitting fibre optic cable 16. End-emitting fibre optic cables transmit light from one end to the other via total internal reflection. The housing also includes a rotatable switch 18 and the first end 14 of the fibre optic cable is arranged to rotate with the switch 18. By rotating the switch 18 the first end 14 of the fibre optic can be aligned which each of the different LEDs 12.

The system also includes a remote display unit 20, situated remotely from the housing 10. The second end 22 of the fibre optic cable 16 is located within the display unit 20.

Light from the LED aligned with the first end 14 of the fibre optic cable is transmitted through the cable 16 and can be viewed on the display unit 20. Labels 24 and an arrow 26 on the exterior of the housing 10 may indicate the colour of light to be transmitted. For example, if the switch is aligned to "Red", the first end 14 of the fibre optic cable is aligned with the red LED and red light is transmitted through the cable to the second end 22 of the cable where it is and viewable through a window 24 at the display unit 20. The labels on the housing may also indicate the signal that the user requires to be transmitted to the display unit. For example, if the system is being used in a nursing home the resident may wish to indicate to staff that assistance is required.

In the simplest arrangement, there may be just one light source within the housing and rotating the knob, and hence the cable, allows light to be either transmitted or not transmitted to the display. In this way a user can turn on a light, for example to indicate that assistance is required, without actually activating an electrical circuit, since the LED is permanently lit. The rotating knob may be provided with a detent system as a means to resist or arrest the rotation of the knob to ensure the cables are at the optimum position.

The system could also be reversed, such that the first end of the fibre optic cable is held static within the housing and the light or lights are rotated with the knob to bring them into alignment with the first end of the fibre optic cable.

FIGS. 3, 4a and 4b illustrate an alternative example of the invention, in which a rotating shutter 26 is used, rather than rotating the optical fibre cable itself. In the simplest arrangement the housing includes one LED 12 which is aligned with the first end 14 of the optical fibre cable 16. A rotating shutter 26 is located between the LED 12 and the optical fibre cable and the rotating shutter 26 comprises one aperture 28. The aperture 28 in the shutter 26 may be aligned with the LED 12, allowing light to pass into the first end 14 of the optical fibre cable, as shown in FIG. 4a, or it may not be aligned with the cable, as shown in FIG. 4b so that light from the LED 12 is blocked from entering the first end 14 of the optical fibre cable. In this way the light at the remote display can be turned 'on' or 'off' by rotating the shutter, as the labels 24' on the exterior of the housing 10' indicate. This turning on or off of the light at the display unit is therefore achieved without completing an electrical circuit.

FIG. 5 illustrates a side view of an alternative rotating shutter 26' which comprises a plurality of apertures 28, 28', 28". The different apertures may be provided with different coloured lenses or filters. Using this arrangement, the user can change the colour of light displayed at the remote display without needing a plurality of different coloured LEDs within the housing.

Figure 6A:
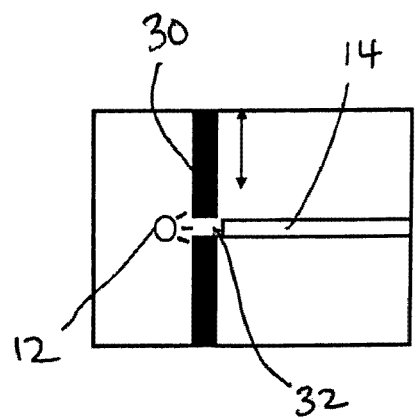
FIG. 6a illustrates a stylistic cross-sectional view through part of an alternative system including one light source and a sliding shutter with the shutter aperture aligned with the light source.
Figure 6B:
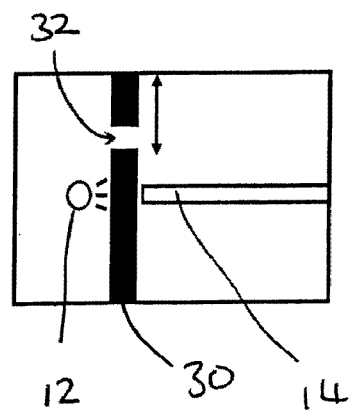
FIG. 6b illustrates a stylistic cross-sectional view through part of an alternative system including one light source and a sliding shutter where the shutter aperture is not aligned with the light source.

As illustrated in FIGS. 6a and 6b, the shutter need not necessarily rotate. FIGS. 6a and 6b illustrate a comparable arrangement with a sliding shutter 30. In FIG. 6a the aperture 32 of the sliding shutter 30 is aligned with the LED 12 and allows light to enter the first end 14 of the optical fibre cable, whereas in FIG. 6b the shutter has been moved so that the aperture 30 is no longer aligned with the LED 12 and light is therefore blocked from entering the first end 14 of the optical fibre cable.

In the example illustrated in FIGS. 7a and 7b, a user can signal to various locations, labelled 'X', 'Y', and 'Z' in the example. The housing 10" includes a plurality of optical fibre cables 16, each of which may terminate at a different remote display unit, each in a different location. Rotating the switch 18 allows a different cable to be aligned with the LED, allowing a user to transmit a signal to a plurality of different locations from the one housing.

The light source or sources need not be directly present within the housing. Instead, as illustrated in FIG. 8, the light source or sources may be located remotely and transmitted to the housing via optical fibre cabling 34. This arrangement may be useful in areas where live power sources are not desirable, for example in a bathroom environment or in a child's room.

The invention claimed is:

1. A remote indicator system for enabling a signal to be sent from a first location to a second location, the system comprising a housing located at the first location and a display unit located remotely from the housing at the second location, the housing comprising a first light source which is electrically powered and illuminated, and a first end of an end-emitting fibre optic cable; wherein a second end of the end-emitting fibre optic cable is located within the display unit;

wherein the housing includes manual switching means having at least two states, including: a first state in which light from the first light source is allowed to pass into the first end of the end-emitting fibre optic cable and light is transferred to the second end of the end-emitting fibre optic cable, providing a visible indicator light on the display unit; and a second state in which light from the first light source is prevented from passing into the first end of the end-emitting fibre optic cable, and light is prevented from transmission to the second end of the end-emitting fibre optic cable, such that the indicator light is not illuminated on the display unit;

and wherein the manual switching means is operable by an individual at the first location and allows the individual at the first location-to switch on and to switch off an indicator light on the display unit without completion of an electrical circuit such that the indicator light on the display unit is viewable by a second individual at the second location.

2. A remote indicator system according to claim 1, wherein the manual switching means for aligning the first end of the end-emitting fibre optic cable with the first light source comprises one of: a moveable end-emitting fibre optic cable and a moveable first light source.

3. A remote indicator system according to claim 1, wherein the first end of the fibre optic cable is incorporated into a moveable assembly and the manual switching means comprises movement of the moveable assembly to effect alignment or unalignment of the first end of the end-emitting fibre optic cable with the first light source, the moveable assembly having an aligned position in which the first end of the end-emitting fibre optic cable is aligned with the first light source and an unaligned position in which the first end of the end-emitting fibre optic cable is unaligned with the first light source.

4. A remote indicator system according to claim 3, wherein the moveable assembly is manually rotatable between the aligned and unaligned positions.

5. A remote indicator system according to claim 3, wherein the moveable assembly is manually slidable between the aligned and unaligned positions.

6. A remote indicator system according to claim 3, wherein the housing comprises a plurality of different coloured light sources and the moveable assembly has a plurality of aligned positions in which the first end of the fibre optic cable is aligned with each of the light sources in turn.

7. A remote indicator system according to claim 1, wherein the housing includes a plurality of first ends of a plurality of fibre optic cables, and a plurality of display units, each display unit including a second end of one of the fibre optic cables.

8. A remote indicator system according to claim 1 wherein the first end of the fibre optic cable is aligned with the first light source and the manual switching means comprises a manually moveable shutter positioned between the first light source and the first end of the end-emitting fibre optic cable, the shutter having at least one aperture, wherein the shutter has at least two positions: a first position in which the aperture is substantially aligned with the first light source and light from the first light source passes into the first end of the end-emitting fibre optic cable, and a second position in which the aperture unaligned with the first light source and the shutter prevents light from the first light source passing into the first end of the end-emitting fibre optic cable.

9. A remote indicator system according to claim 8, wherein the shutter comprises a plurality of apertures, each aperture being provided with a different coloured filter, and wherein the shutter is moveable to a plurality of positions such that each aperture is alignable with the first light source.

10. A remote indicator system according to claim 1 wherein the first light source is an LED.

11. A remote indicator system according to claim 1, wherein the first light source is located remotely from the housing and the light therefrom transferred to the housing via an end-emitting fibre optic cable.

\* \* \* \* \*